United States Patent [19]
Butter et al.

[11] Patent Number: 6,049,362
[45] Date of Patent: Apr. 11, 2000

[54] DUAL PRIME MOTION ESTIMATION SYSTEM AND METHOD

[75] Inventors: Adrian Stephen Butter, Binghamton, N.Y.; Charles John Stein, Peckville, Pa.; Ronald Steven Svec, Berkshire, N.Y.

[73] Assignee: International Business Machines Corporation, Armonk, N.Y.

[21] Appl. No.: 08/601,486

[22] Filed: Feb. 14, 1996

[51] Int. Cl.$^7$ .................................................. H04N 7/32
[52] U.S. Cl. ........................... 348/699; 348/409; 348/420
[58] Field of Search .................... 348/384, 390, 348/400–402, 407, 409–413, 415, 416, 420, 699; 382/232, 236, 238; H04N 7/137

[56] References Cited

U.S. PATENT DOCUMENTS

| | | | |
|---|---|---|---|
| 5,210,605 | 5/1993 | Zaccarin et al. | 358/105 |
| 5,253,056 | 10/1993 | Puri et al. | 348/384 |
| 5,398,068 | 3/1995 | Liu et al. | 348/416 |
| 5,398,078 | 3/1995 | Masuda et al. | 348/699 |
| 5,400,087 | 3/1995 | Uramoto et al. | 348/699 |
| 5,414,469 | 5/1995 | Gonzales et al. | 348/408 |
| 5,428,403 | 6/1995 | Andrew et al. | 348/699 |
| 5,436,666 | 7/1995 | Astle | 348/416 |
| 5,438,374 | 8/1995 | Yan | 348/620 |
| 5,448,310 | 9/1995 | Kopet et al. | 348/699 |
| 5,467,136 | 11/1995 | Odaka et al. | 348/699 |
| 5,500,689 | 3/1996 | Lam | 348/699 |
| 5,619,268 | 4/1997 | Kobayashi et al. | 348/416 |

OTHER PUBLICATIONS

International Organisation For Standardisation Organisation Internationale De Normalisation ISO/IEC JTC1/SC29/WG11 Coding Of Moving Pictures & Associated Audio ISO/IEC JTC1/SC29/WG11 Nov. 9, 1994 pp. 91–93.

*Primary Examiner*—Richard Lee
*Attorney, Agent, or Firm*—Richard M. Goldman

[57] ABSTRACT

A method of and apparatus for identifying a Dual Prime motion estimation best match and generating motion vectors pertaining thereto for inter-picture video compression in a motion picture having images of $F_1$ and $F_2$ parities. The Dual Prime method of motion estimation described herein includes a method of generating motion vectors. The motion vectors point from a macroblock in a current field to a macroblock in a past field for inter-picture video compression in a motion picture having images of $F_1$ and $F_2$ parities. The first step in the method is defining a macroblock in a parity field of the current picture. Next, the preceding field of the same or opposite parity is searched to find a first best match macroblock in the preceding field. Once a best match macroblock is found, a vector is formed from the current macroblock in the current parity field to the first best match macroblock in the preceding parity field. This vector is scaled so that it refers to a second dual prime macroblock in the opposite parity field, that is the parity field of opposite parity with respect to the first best match macroblock which defines the center of a dual prime search window. Then, the average of the first best match macroblock and the set of second dual prime macroblocks in the dual prime search window is taken and the search window is searched to determine the best match dual prime macroblock. The search is typically conducted at half pixel locations inside a one square pixel dual prime search window. The appropriate dual prime motion vector and differential motion vector (dmv) are formed. These are motion vectors which point to both the first best match macroblock and the best match dual prime macroblock.

6 Claims, 10 Drawing Sheets

TABLE 2

| TABLE 2. DPR DATA FETCH SIZE/# OF SEARCHES DECODING | | | |
|---|---|---|---|
| EDGE DETECTION VALUE | FULL PEL X-Y POINTER VALUE | DPR FETCH SIZE | # OF SEARCHES |
| TL | XFULL-YFULL | 17X17 (FIELD)<br>17X9 (FRAME) | 4 |
| TR | XFULL-YFULL | 17X17 (FIELD)<br>17X9 (FRAME) | 4 |
| BL | XFULL-YFULL | 17X17 (FIELD)<br>17X9 (FRAME) | 4 |
| BR | XFULL-YFULL | 17X17 (FIELD)<br>17X9 (FRAME) | 4 |
| T | XFULL-YFULL | 18X17 (FIELD)<br>18X9 (FRAME) | 6 |
| T | XHALF-YFULL | 17X17 (FIELD)<br>17X9 (FRAME) | 6 |
| B | XFULL-YFULL | 18X17 (FIELD)<br>18X9 (FRAME) | 6 |
| B | XHALF-YFULL | 17X17 (FIELD)<br>17X9 (FRAME) | 6 |
| R | XFULL-YFULL | 17X18 (FIELD)<br>17X10 (FRAME) | 6 |
| R | XFULL-YHALF | 17X17 (FIELD)<br>17X9 (FRAME) | 6 |
| L | XFULL-YFULL | 17X18 (FIELD)<br>17X10 (FRAME) | 6 |
| L | XFULL-YHALF | 17X17 (FIELD)<br>17X9 (FRAME) | 6 |
| NONE | XFULL-YFULL | 18X18 (FIELD)<br>18X10 (FRAME) | 9 |
| NONE | XFULL-YHALF | 18X17 (FIELD)<br>18X9 (FRAME) | 9 |
| NONE | XHALF-YFULL | 17X18 (FIELD)<br>17X10 (FRAME) | 9 |
| NONE | XHALF-YHALF | 17X17 (FIELD)<br>17X9 (FRAME) | 9 |

FIGURE 10

DUAL PRIME MOTION ESTIMATION SYSTEM AND METHOD

FIELD OF THE INVENTION

The invention relates to compression of digital visual images, and more particularly to temporal compression, that is redundancy between pictures. Redundancy between pictures is reduced, or even eliminated, through the use of motion vectors.

BACKGROUND OF THE INVENTION

Within the past decade, the advent of world-wide electronic communications systems has enhanced the way in which people can send and receive information. In particular, the capabilities of real-time video and audio systems have greatly improved in recent years. In order to provide services such as video-on-demand and videoconferencing to subscribers, an enormous amount of network bandwidth is required. In fact, network bandwidth is often the main inhibitor to the effectiveness of such systems.

In order to overcome the constraints imposed by networks, compression systems have emerged. These systems reduce the amount of video and audio data which must be transmitted by removing redundancy in the picture sequence. At the receiving end, the picture sequence is uncompressed and may be displayed in real-time.

One example of an emerging video compression standard is the Moving Picture Experts Group ("MPEG") standard. Within the MPEG standard, video compression is defined both within a given picture and between pictures. Video compression within a picture is accomplished by conversion of the digital image from the time domain to the frequency domain by a discrete cosine transform, quantization, variable length coding, and Huffman coding. Video compression between pictures is accomplished via a process referred to as motion compensation, in which a motion vector is used to describe the translation of a set of picture elements (pels) from one picture to another.

OBJECTS OF THE INVENTION

It is a primary object of the invention to provide high speed, efficient motion estimation (temporal compression) that can be used to efficiently reconstruct (decompress) the image.

SUMMARY OF THE INVENTION

These and other objectives of the invention are accomplished by the method of generating motion vectors for inter-picture video compression in a motion picture having images of $F_1$ and $F_2$ parities. The motion vector extends from a current field macroblock to a past field macroblock. The method of the invention starts from a current macroblock in the current field. The search initially proceeds backwards in time with searching a preceding field to find a first best match macroblock in the preceding picture.

As used herein "Reference MB" or "Reference Macroblock" refers to a real macroblock (MB) from the previous picture which represents the best match within the non-dual prime search window. According to the method of the invention a vector is formed extending from the current macroblock in the current field to the best match macroblock in a preceding field. This vector is scaled so that it refers to another, i.e., a second or "dual prime reference" (DPR) macroblock in the opposite parity field with respect to the reference macroblock. The scaled vector is referred to as a "Dual Prime Motion Vector" (DPMV).

A search is carried out using a set of Dual Prime Reference Macroblock (DPR MB) locations which are averaged with the reference macroblock. The set of averaged macroblocks may be referred to as either "virtual" or "dual prime" macroblocks. The best match dual prime macroblock is selected based on the smallest absolute difference error generated when compared to the current macroblock. In the event of a tie, the location of the best match dual prime macroblock is determined to be the one whose differential motion vector (dmv) will be the most efficiently encoded.

THE FIGURES

The invention may be more clearly understood by reference to the Figures appended hereto.

FIG. 1 shows a flow diagram of a generalized MPEG2 compliant encoder 11, including a discrete cosine transformer 21, a quantizer 23, a variable length coder 25, an inverse quantizer 29, an inverse discrete cosine transformer 31, motion compensation 41, frame memory 42, and motion estimation 43. The data paths include the $i^{th}$ picture input 111, difference data 112, motion vectors 113 the picture output 121, the feedback picture for motion estimation and compensation 131, and the motion compensated picture 101. This FIGURE has the assumptions that the $i^{th}$ pictures exists in Frame Memory or Frame Store 42, and that the $i+1^{th}$ picture is being encoded with motion estimation.

Figure 9:
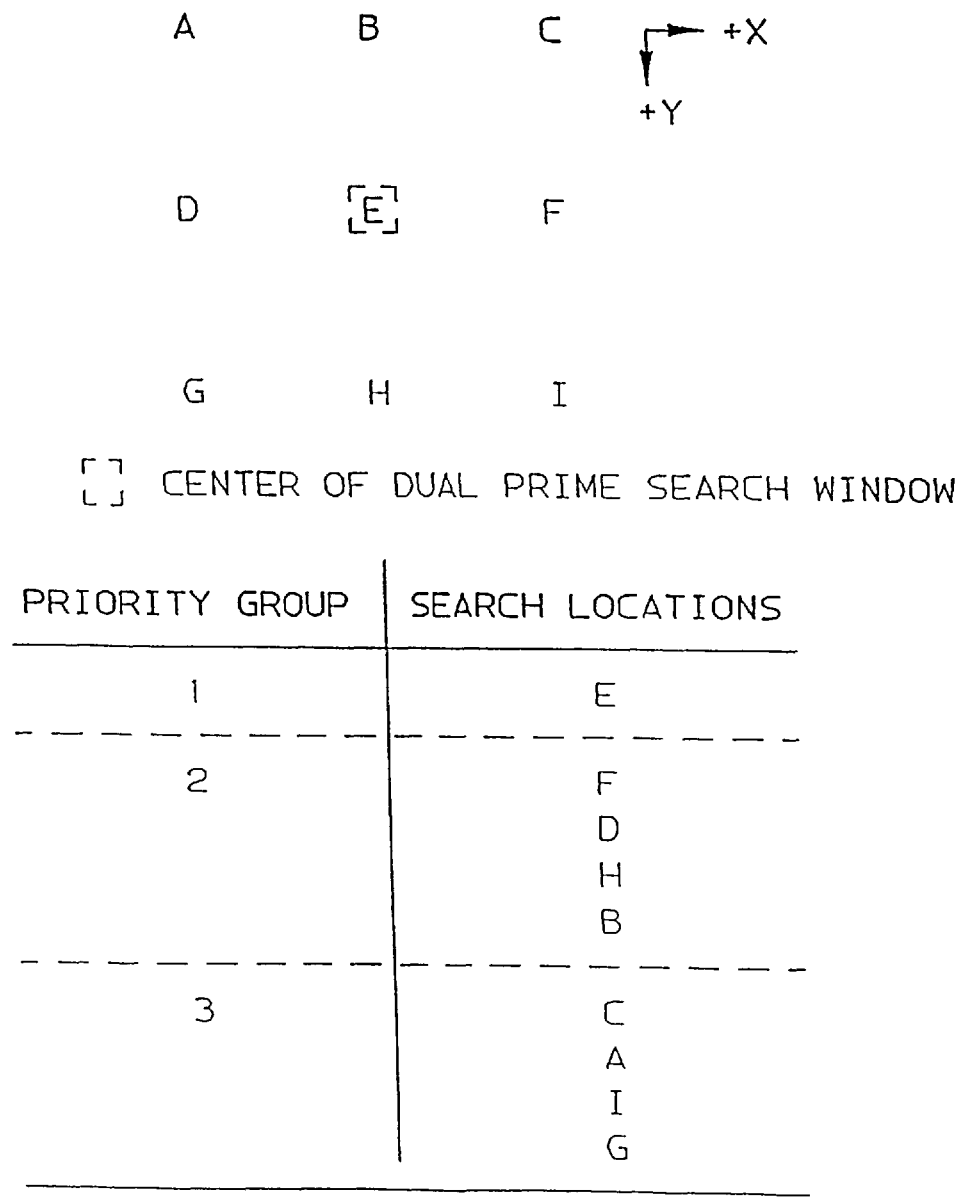

FIG. 9 illustrates the dual prime search operation result priority. The "e" inside of the box formed by broken lines indicates the center of the dual prime search window. The priority groups and search locations are indicated in the table that is a part of the FIGURE.

FIG. 10 shows the translation used to determine both the DPR data fetch size and the number of valid Dual Prime searches.

DETAILED DESCRIPTION OF THE INVENTION

The invention relates to MPEG and HDTV compliant encoders and encoding processes. The encoding functions performed by the encoder include data input, motion estimation, macroblock mode generation, data reconstruction, entropy coding, and data output. Motion estimation and compensation are the temporal compression functions. They are repetitive functions with high computational requirements, and they include intensive reconstructive processing, such as inverse discrete cosine transformation, inverse quantization, and motion compensation.

More particularly the invention relates to motion estimation, compensation, and prediction, and even more particularly to the calculation of motion vectors. Motion compensation exploits temporal redundancy by dividing the current picture into blocks, for example, macroblocks, and then searching in previously transmitted pictures for a nearby block with similar content. Only the difference between the current block pels and the predicted block pels extracted from the reference picture is actually compressed for transmission and thereafter transmitted.

The simplest method of motion compensation and prediction is to record the luminance and chrominance, i.e., intensity and color, of every pixel in an "I" picture, then record changes of luminance and chrominance, i.e., intensity and color for every specific pixel in the subsequent picture. However, this is uneconomical in transmission medium bandwidth, memory, processor capacity, and processing time because objects move between pictures, that is, pixel contents move from one location in one picture to a different location in a subsequent picture. A more advanced idea is to use a previous picture to predict where a block of pixels will be in a subsequent picture or pictures, for example, with motion vectors, and to write the result as "predicted pictures" or "P" pictures. More particularly, this involves making a best estimate or prediction of where the pixels or macroblocks of pixels of the i+1$^{th}$ picture will be in the i$^{th}$ picture. It is one step further to use both subsequent and previous pictures to predict where a block of pixels will be in an intermediate or "B" picture.

Figure 1:
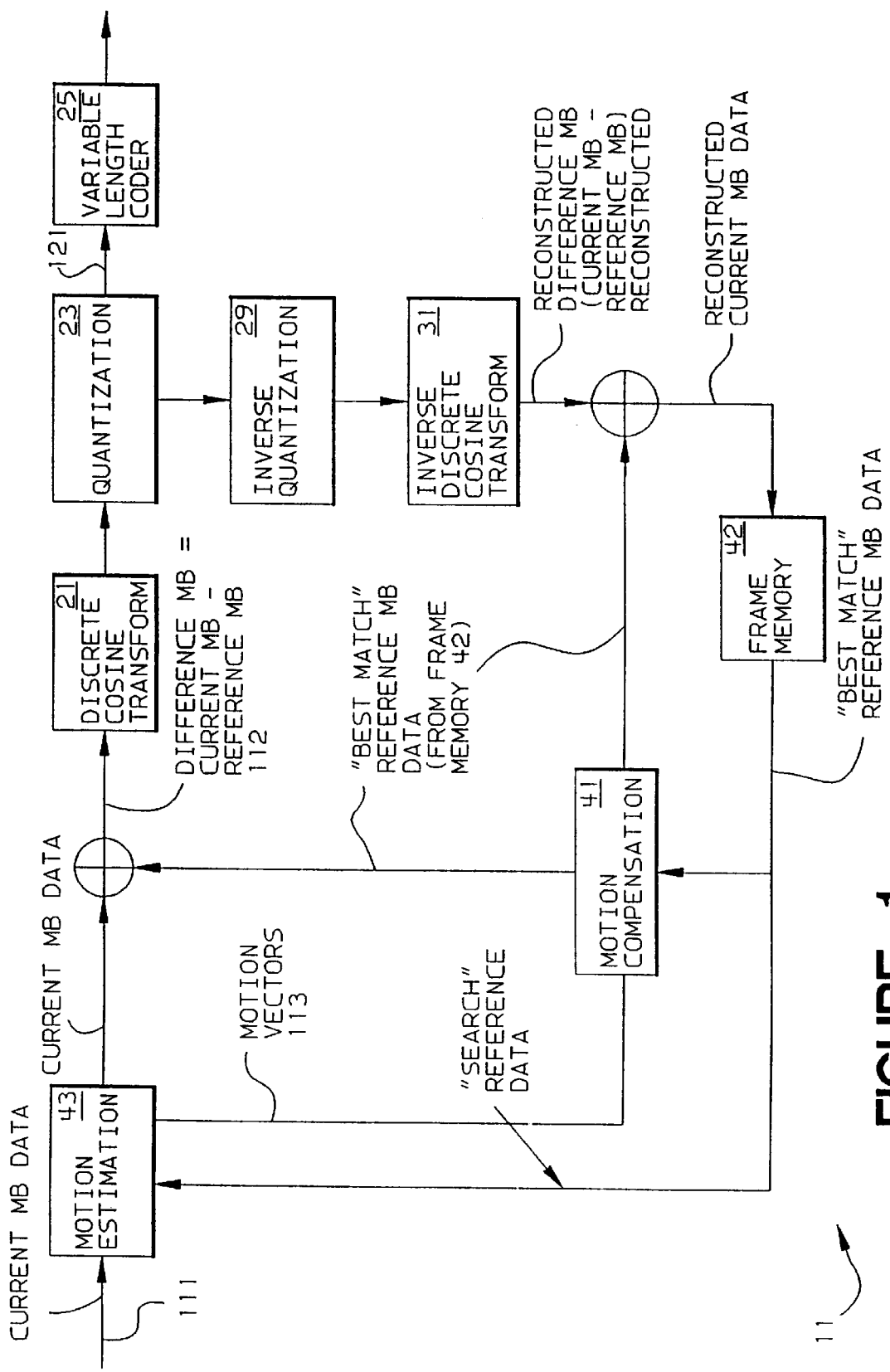

To be noted is that the picture encoding order and the picture transmission order do not necessarily match the picture display order. See FIG. 2. For I-P-B systems the input picture transmission order is different from the encoding order, and the input pictures must be temporarily stored until used for encoding. A buffer stores this input until it is used, For purposes of illustration, a generalized flow chart of MPEG compliant encoding is shown in FIG. 1. In the flow chart the images of the i$^{th}$ picture and the i+1$^{th}$ picture are processed to generate motion vectors. The motion vectors predict where a macroblock of pixels will be in a prior and/or subsequent picture. The use of the motion vectors instead of full images is a key aspect of temporal compression in the MPEG and HDTV standards. As shown in FIG. 1 the motion vectors, once generated, are used for the translation of the macroblocks of pixels, from the i$^{th}$ picture to the i+1$^{th}$ picture.

As shown in FIG. 1, in the encoding process, the images of the i$^{th}$ picture and the i+1$^{th}$ picture are processed in the encoder 11 to generate motion vectors which are the form in which, for example, the i+1$^{th}$ and subsequent pictures are encoded and transmitted. An input image 111X of a subsequent picture goes to the Motion Estimation unit 43 of the encoder. Motion vectors 113 are formed as the output of the Motion Estimation unit 43. These vectors are used by the Motion Compensation Unit 41 to retrieve macroblock data from previous and/or future pictures, referred to as "reference" data, for output by this unit. One output of the Motion Compensation Unit 41 is negatively summed with the output from the Motion Estimation unit 43 and goes to the input of the Discrete Cosine Transformer 21. The output of the Discrete Cosine Transformer 21 is quantized in a Quantizer 23. The output of the Quantizer 23 is split into two outputs, 121 and 131 one output 121 goes to a downstream element 25 for further compression and processing before transmission, such as to a run length encoder; the other output 131 goes through reconstruction of the encoded macroblock of pixels for storage in Frame Memory 42. In the encoder shown for purposes of illustration, this second output 131 goes through an inverse quantization 29 and an inverse discrete cosine transform 31 to return a lossy version of the difference macroblock. This data is summed with the output of the Motion Compensation unit 41 and returns a lossy version of the original picture to the Frame Memory 42.

Figure 2:
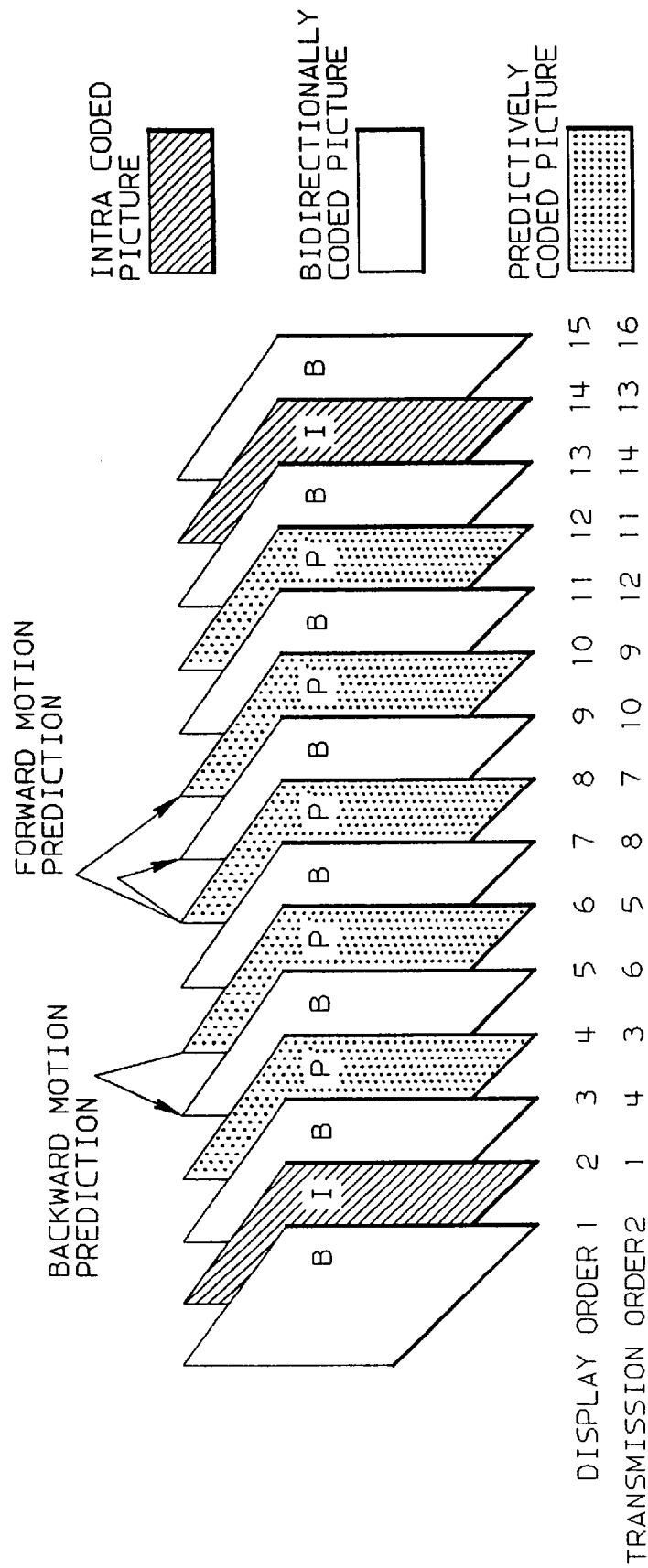
FIG. 2 illustrates the I, P, and B pictures, examples of their display and transmission orders, and forward, and backward motion prediction.

As shown in FIG. 2, there are three types of pictures. There are "Intra pictures" or "I" pictures which are encoded and transmitted whole, and do not require motion vectors to be defined. These "I" pictures serve as a source of motion vectors. There are "Predicted pictures" or "P" pictures which are formed by motion vectors from a previous picture and can serve as a source of motion vectors for further pictures. Finally, there are "Bidirectional pictures" or "B" pictures which are formed by motion vectors from two other pictures, one past and one future, and can not serve as a source of motion vectors. Motion vectors are generated from "I" and "P" pictures, and are used to form "P" and "B" pictures.

Figure 3:
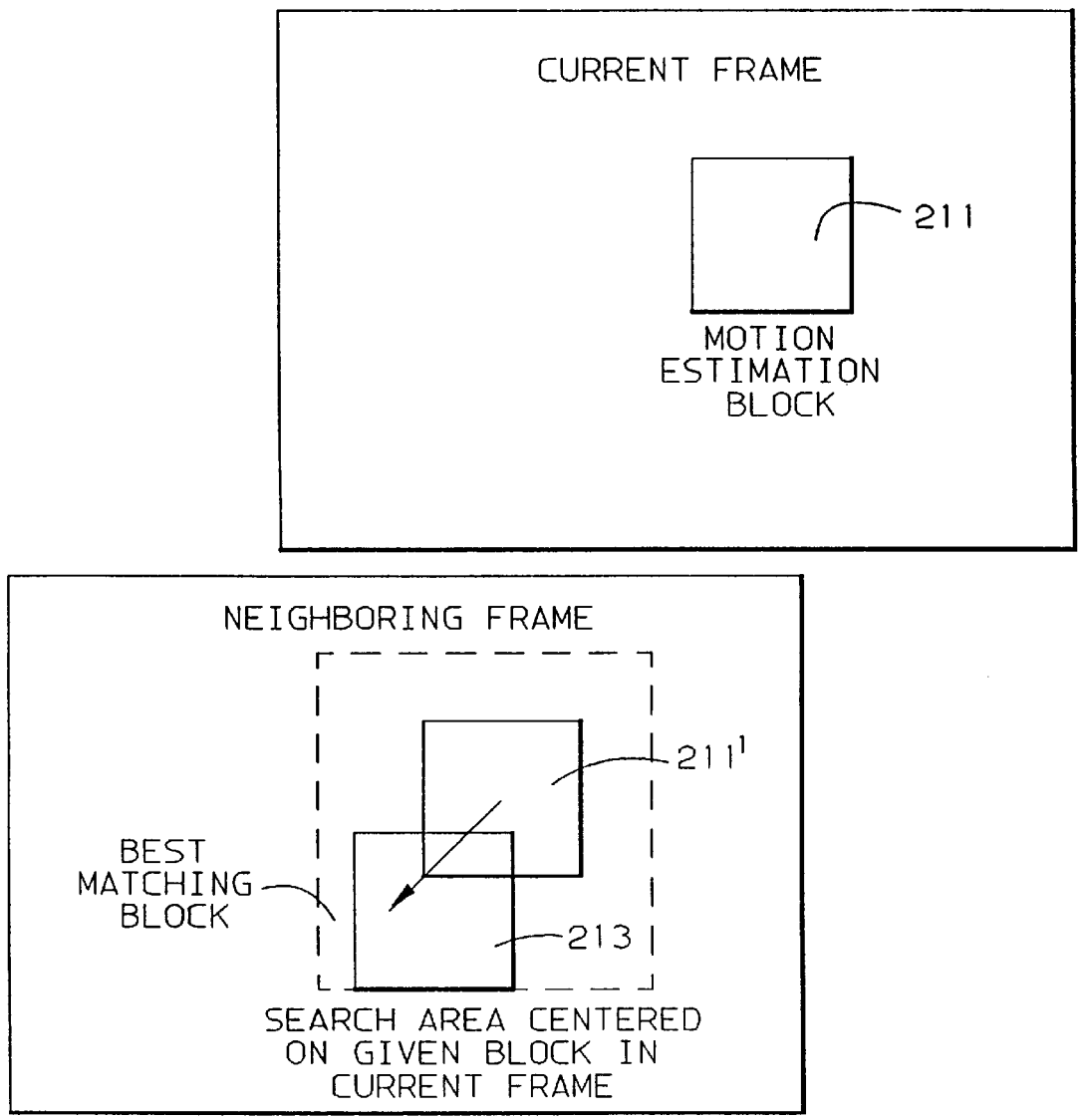
FIG. 3 illustrates the search from the motion estimation block in the current frame or picture to the best matching block in subsequent or previous frame or picture. Elements 211 and 211' represent the same location in both pictures.
Figure 4:
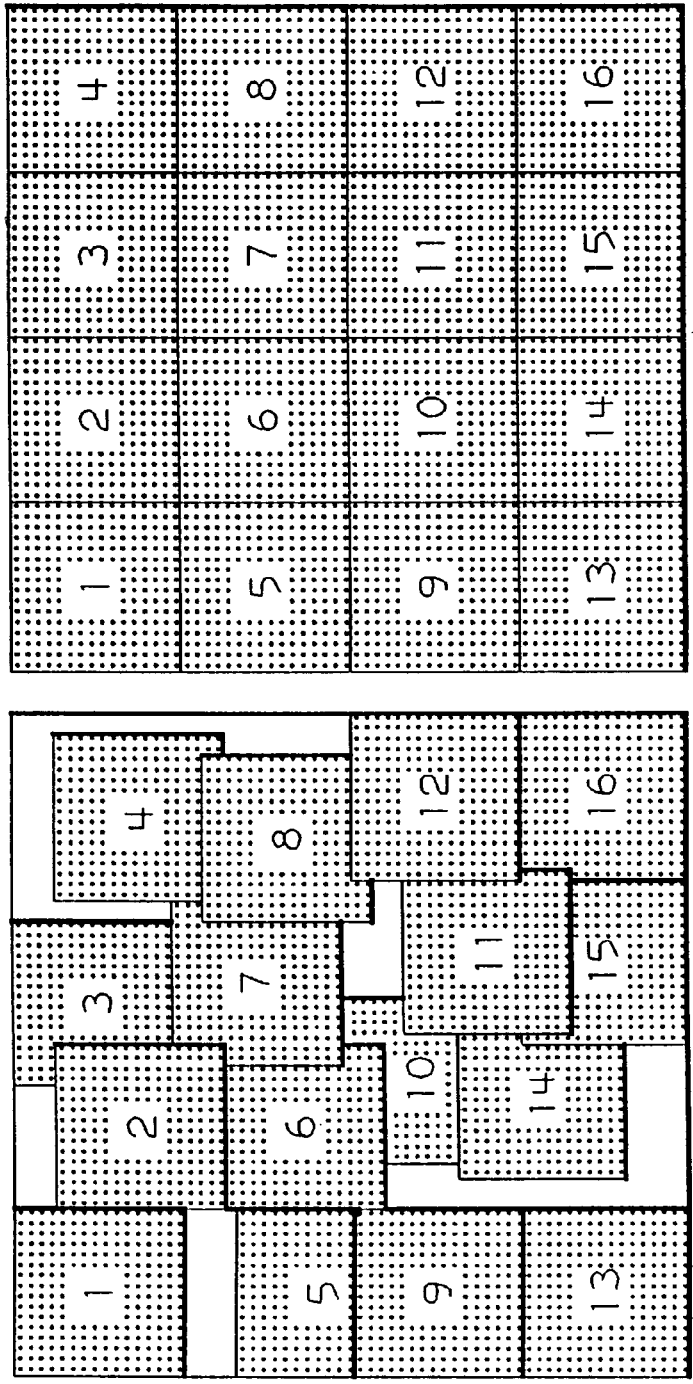
FIG. 4 illustrates the movement of blocks in accordance with the motion vectors from their position in a previous picture to a new picture, and the previous picture's blocks adjusted after using motion vectors.

One method by which motion estimation is carried out, shown in FIG. 3, is by a search from a macroblock 211 of an i+1$^{th}$ picture throughout a region of the previous picture to find the best match macroblock 213 (211' is the same location as 211 but in the previous picture). Translating the macroblocks in this way yields a pattern of macroblocks for the i+1$^{th}$ picture, as shown in FIG. 4. In this way the i$^{th}$ picture is changed a small amount, e.g., by motion vectors and difference data, to generate the i+1$^{th}$ picture. What is encoded are the motion vectors and difference data, and not the i+1$^{th}$ picture itself Motion vectors translate position of an image from picture to picture, while difference data carries changes in chrominance, luminance, and saturation, that is, changes in color and brightener.

Returning to FIG. 3, we look for a good match by starting from the same location in the i$^{th}$ picture 211' as in the i+1$^{th}$ picture 211X. A search window is created in the i$^{th}$ picture. We search for a best match with in this search window. Once found, the best match motion vectors for the macroblock are coded. The coding of the best match macroblock includes a motion vector, that is, how many pixels in the y direction and how many pixels in the x direction is the best match displaced in the next picture. Also encoded is difference data, also referred to as the "prediction error", which is the difference in chrominance and luminance between the current macroblock and the best match reference macroblock.

Dual Prime Motion Estimation

The dual prime method of the invention is a more sophisticated way to get to a best match block for motion estimation in order to generate the prediction vectors, i.e., the motion vectors and the differences, potentially resulting in more temporal compression. The dual prime method of motion estimation uses two past reference macroblocks to derive a virtual past reference macroblock. Central to dual prime motion estimation is the observation that the best match macroblock may be obtained from the average of two past reference pictures, that is, two fields. For this reason the dual prime method uses both parities, $F_1$ and $F_2$, of the picture, takes a linear interpolation of them to look backward in time to find the best match macroblock, and encodes the motion vectors and the difference data. In this way only the vectors and difference data are encoded instead of the entire macroblock.

In dual prime motion compensation for a field picture as defined in the MPEG2 standard, a decoder starts with a vector to a first reference macroblock in the same parity field, scales the vector by one-half and adds a small differential motion vector (dmv) to identify a second reference macroblock in the opposite parity field. These two reference macroblocks are averaged together to come out with a predicted macroblock for motion compensation.

The Dual Prime method of motion estimation described herein includes a method of generating motion vectors. The motion vectors point from a macroblock in a current field to a macroblock in a past field for inter-picture video compression in a motion picture having images of $F_1$ and $F_2$ parities. The first step in the method is defining a macroblock in a parity field of the current picture. Next, the preceding field of the same or opposite parity is searched to find a first best match macroblock in the preceding field. Once a best match macroblock is found, a vector is formed from the current macroblock in the current parity field to the first best match macroblock in the preceding parity field. This vector is scaled so that it refers to a second dual prime macroblock in the opposite parity field, that is the parity field of opposite parity with respect to the first best match macroblock which defines the center of a dual prime search window. Then, the average of the first best match macroblock and the set of second dual prime macroblocks in the dual prime search window is taken and the search window is searched to determine the best match dual prime macroblock. The search is typically conducted at half pixel locations inside a one square pixel dual prime search window. The appropriate dual prime motion vector and differential motion vector (dmv) are formed. These are motion vectors which point to both the first best match macroblock and the best match dual prime macroblock.

Typically, the first best match macroblock is displaced d pixels from the current macroblock, and the second best match macroblock is displaced d/2, 3d/2, or 2d pixels from the current macroblock. Typically, the search for the best match dual prime macroblock is conducted within a one square pixel search area, and is a nine point search.

Figure 5:
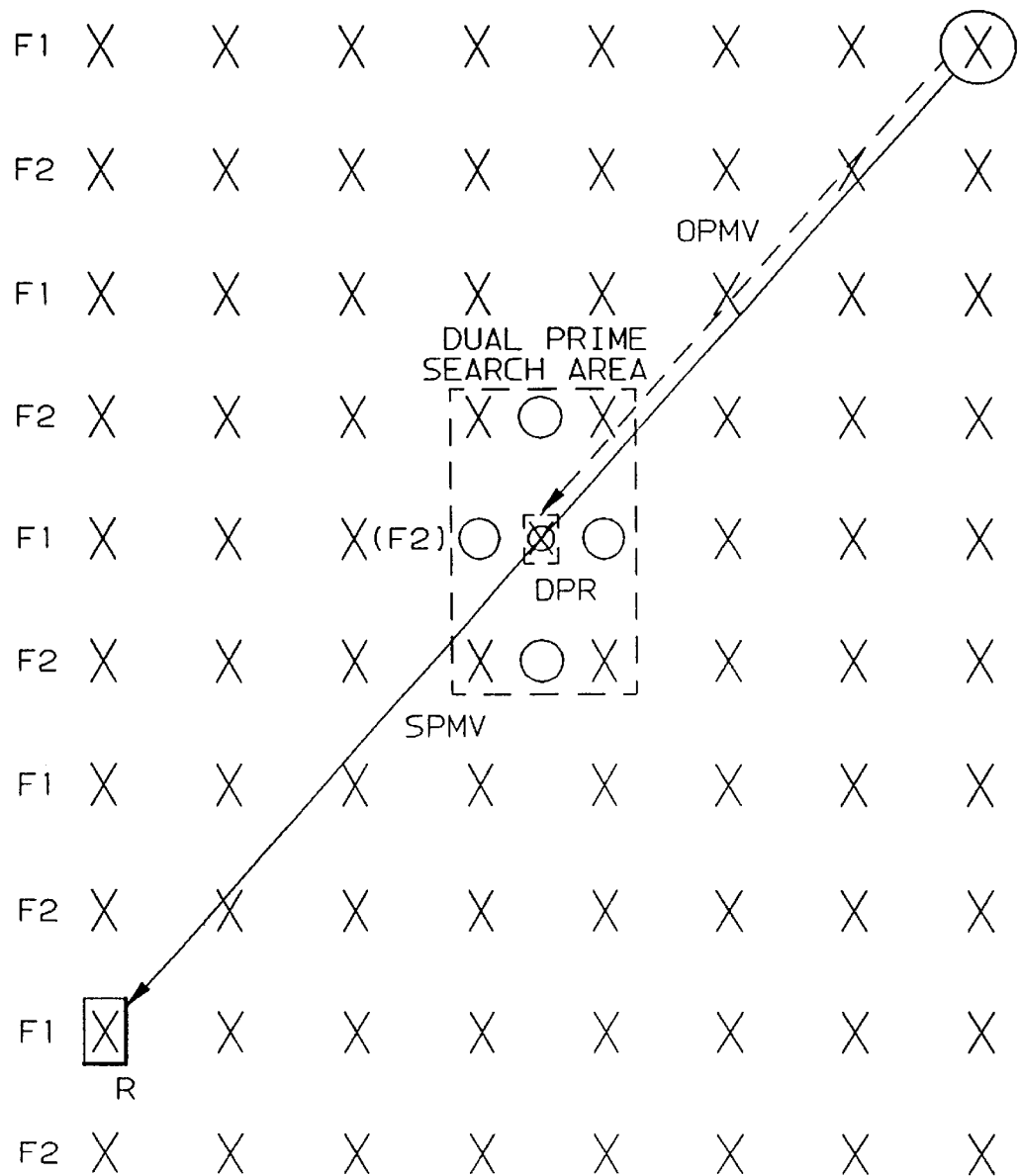
FIG. 5 is a representation of the Dual Prime vectors for a field picture with the same parity references, that is both $F_1$ or both $F_2$. The FIGURE shows the opmv and spmv vectors, the references DPR and R, and the Dual Prime Search Area.

Turning to FIG. 5 the Dual Prime method for field pictures is shown with a search of the opposite parity field to find the best match. As shown in the figure, a reference macroblock starting at pixel R of the same parity field as the current macroblock and displaced d pixels from the current macroblock provides the base motion vector. The vector d is then scaled by ½, which identifies a macroblock location in the opposite parity field whose position defines the center of a nine point Dual Prime search window. The dual prime search operation is then performed using the average of the same parity reference macroblock with each of the nine opposite parity reference macroblocks as the set of "Dual Prime" reference macroblocks. The best match dual prime result produced by this search has two motion vectors associated with it as well as a difference macroblock which all may be directly encoded per the MPEG2 Standard. The two motion vectors are d, the motion vector which points to the same parity reference field, and the differential motion vector (dmv) which provides the half pixel displacement from the center of the Dual Prime search window of the opposite parity field macroblock used to calculate the best match dual prime result.

The invention includes an efficient, flexible system for performing Dual Prime motion estimation with in an encoder using microcode and hardware. In the disclosed environment, microcode is utilized to perform motion vector scaling operations which are specified by the MPEG standard. These calculations result in set up parameters which are used by the system to determine the size of the Dual Prime search window, fetch the required Dual Prime reference data pertaining to the search window, carry out Dual Prime motion estimation calculations and select the calculation and its corresponding location which provides the best match in terms of motion estimation and encoding efficiency.

In the preferred embodiment of this invention, microcode is provided a reference data motion vector, which locates the position of a best match reference Macro Block (MB) data with respect to a given current MB position. Microcode is also provided with whether the picture structure is frame or field, in addition to the horizontal and vertical picture sizes.

The first step performed by microcode is to scale the reference data motion vector and produce either one or two Dual Prime data motion vectors, depending on whether the picture structure is field or frame, respectively. For a field-structured picture, microcode has the flexibility to scale the reference data motion vector in one of two ways. The first way represents a straight-forward method provided in the MPEG standard, in which the best match reference MB is of the same parity relative to the current MB. As shown in FIG. 5 the reference data motion vector spmv which points at starting location R of the best match reference MB, is scaled by a factor of 0.5, represented by motion vector opmv. This scaled motion vector, which represents the Dual Prime data motion vector, points at the starting location DPR of the Dual Prime reference data. This location, which is of opposite parity with respect to both the current and reference MBs, represents the center of a one square pel window which may be searched for the Dual Prime motion estimation best match.

Figure 6:
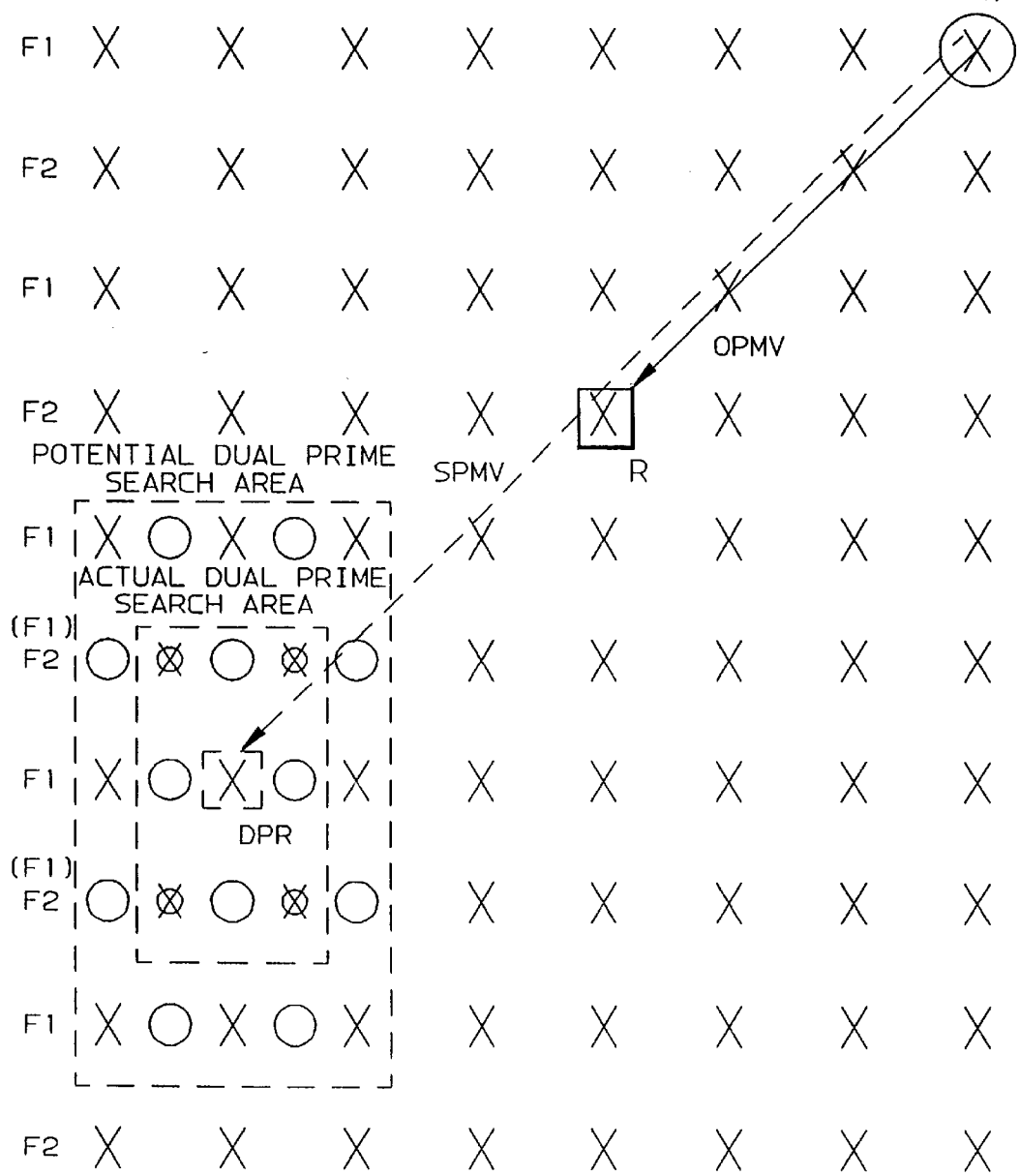
FIG. 6 is a representation of the Dual Prime vectors for a field picture with opposite parity references, that is, one $F_1$ and one $F_2$. The FIGURE shows the opmv and spmv vectors, the references DPR and R, and the Dual Prime Search Area.

The second way in which microcode may scale the reference data motion vector for a field-structured picture is novel in that a best match reference MB of opposite parity relative to the current MB is provided. As shown in FIG. 6, the reference data motion vector opmv, which points at starting location R of the best match reference MB, is scaled by a factor of 2, represented by motion vector spmv. This scaled motion vector, which represents the Dual Prime data motion vector, points at the starting location DPR of the Dual Prime reference data. This location, which is of the same parity with respect to the current MB but of opposite parity with respect to the reference MB, represents the center of a four square pel window which may be searched for the Dual Prime motion estimation best match.

Using the latter method, it is noted that the parity of the locations of the best match reference MB and the Dual Prime reference MB data which is located at the center of the Dual Prime search window are opposite with respect to the former method. If Dual Prime motion estimation is found to provide the best match in this situation, the encoded motion vectors must reflect that the parity of the best match reference MB is the same as that of the current MB. This requires that the motion vectors derived using the latter method be translated by microcode into the proper format.

In order to calculate the encoded motion vectors pertaining to Dual Prime motion estimation for field-structured pictures, the following equations are defined in the MPEG standard:

Dual Prime Equations $$OP\_HMV=(SP\_HMV*M)//2+HDMV$$

$$OP\_VMV=(SP\_VMV*M)//2+E+VDMV$$

where:
OP_HMV=Opposite parity horizontal motion vector.
OP_VMV=Opposite parity vertical motion vector.
SP_HMV=Same parity horizontal motion vector.
SP_VMV=Same parity vertical motion vector.
HDMV=Horizontal differential motion vector. (values=−1, 0, +1)
VDMV=vertical differential motion vector. (values=−1, 0, +1)
M=Field distance between the 2 fields. This is used to scale the motion vector based on the temporal distance between the fields. (values=1, 3)
E=a correction to reflect the vertical shift between the top field and the bottom field. (for a OP_VMV going from top to bottom field e=−1) for a OP_VMV going from bottom to top field e=+1)
//=indicates a divide with a round away from 0 to the nearest whole number.
All vectors are specified in ½ pel notation.

These equations are used to calculate the opposite parity motion vector from the same parity motion vector. In the case for a field picture when the reference field is of the same parity relative to the current field being searched, microcode will directly receive the motion vector (SP_HMV, SP_VMV). Microcode will then use the equation above to calculate the opposite parity motion vector (OP_HMV, OP_VMV) which will point to the opposite parity field immediately preceding the current field. To calculate (OP_VMV, OP_HMV), microcode uses m=1 for all field pictures and sets the differential motion vector (HDMV, VDMV) to 0. E is set based on whether the current field is top ($F_1$) or bottom ($F_2$). The system will then search a one square pel distance around this location to come up with the best prediction. The location of the best match prediction is specified by the hardware with the differential motion vector (HDMV, VDMV).

In the special case for a field picture when the reference field is of the opposite parity relative to the current field being searched, microcode will receive the opposite parity motion vector (OP_HMV, OP_VMV). The dual prime equations must then be solved for the same parity motion vectors as shown below:

Inverse Dual Prime Equations
(for field pictures, M=1)

$$SP\_HMV=2*OP\_HMV-2*HDMV$$

$$SP\_VMV=2*OP\_VMV-2*E-2*VDMV$$

where:
OP_HMV=Opposite parity horizontal motion vector.
OP_VMV=Opposite parity vertical motion vector.
SP_HMV=Same parity horizontal motion vector.
SP_VMV=Same parity vertical motion vector.
HDMV=Horizontal differential motion vector. (values=−1, 0, +1)
VDMV=vertical differential motion vector. (values=−1, 0, +1)
M=Field distance between the 2 fields. This is used to scale the motion vector based on the temporal distance between the fields. (values=1, 3)
E=a correction to reflect the vertical shift between the top field and the bottom field (for a OP_VMV going from top to bottom field e=−1)(for a OP_VMV going from bottom to top field e=+1)
All vectors are specified in ½ pel notation.

As in the previous case, microcode will use M=1, set (HDMV, VDMV) to 0 and set E based on whether the current field being searched is $F_1$ or $F_2$. Thus, the same parity motion vector (SP_HMV, SP_VMV) may then be calculated by microcode.

In performing the hardware search, the allowable values returned for HDMV and VDMV are −½, 0 and +½. Therefore, the terms −2*HDMV and −2*VDMV will equate to −1, 0 and +1. This corresponds to a search window of four square pels, with valid search locations residing only at fill pel locations. A simplification can be achieved by understanding the rounding that takes place in the dual prime equation. With this, each ½ pel location in the four square pel search window can be used to perform Dual Prime motion estimation.

Once the best match search location is identified, the new same parity motion vector (SP_HMV', SP_VMV') and the differential motion vector (HDMV, VDMV) can be derived using the following equations:

$$SP\_HMV'=SP\_HMV+BM\_HDMV$$

$$SP\_VMV'=SP\_VMV+BM\_VDMV$$

$$HDMV=OP\_HMV-(SP\_HMV'//2)$$

$$VDMV=OP\_VMV-(SP\_VMV'//2)-E$$

where:
SP_HMV=Same parity horizontal motion vector.
SP_VMV=Same parity vertical motion vector.
SP_HMV'=New same parity horizontal motion vector.
SP_VMV'=New same parity vertical motion vector.
OP_HMV=Opposite parity horizontal motion vector.
OP_VMV=Opposite parity vertical motion vector.
HDMV=Horizontal differential motion vector. (values=−1, 0, +1)
VDMV=vertical differential motion vector. (values=−1, 0, +1)
BM_HDMV=Best match horizontal differential motion vector. (values=−2, −1, 0, +1, +2)
BM_VDMV=Best match vertical differential motion vector. (values=−2, −1, 0, +1, +2)
All vectors are specified in ½ pel notation.

The rounding term // makes the ½ pel locations of the search valid. Any ½ pel location that makes the magnitude of the vector larger will round away from the center point of the search window. Any ½ pel location that makes the magnitude of the vector smaller will round to the center point of the search window.

The utility of the special case is that we can search the opposite parity field first, which is more likely to produce a better match since it is closer in time than the same parity field. By having the capability to search any ½ pel location inside the four square pel search area, the same general purpose hardware (defined below) which is used to perform ½ pel Dual Prime searches can be utilized to conduct the Dual Prime search for this special case.

As shown in FIG. 6 one of nine possible locations could be used to identify the center of the Dual Prime search window to the search hardware. The actual location identified by microcode for purposes of performing the Dual Prime search corresponds to the location pointed at by the Dual Prime motion vector. This location was chosen in order to provide a search of pels which lie closest to this vector.

Using only a ½ pel search window in the special case, (HDMV, VDMV) can be derived from (BM_HDMV, BM_VDMV) as shown below:

```
if SP_HMV = 0 then HDMV = -BM_HDMV
if SP_VMV = 0 then VDMV = -BM_VDMV
if SP_HMV > 0 then HDMV = -1 for (BM_HDMV = +1)
    HDMV = 0 for (BM_HDMV = -1 or 0)
if SP_VMV > 0 then VDMV = -1 for (BM_VDMV = +1)
    VDMV = 0 for (BM_VDMV = -1 or 0)
if SP_HMV < 0 then HDMV = +1 for (BM_HDMV = -1)
    HDMV = 0 for (BM_HDMV = +1 or 0)
if SP_VMV < 0 then VDMV = +1 for (BM_VDMV = -1)
    VDMV = 0 for (BM_VDMV = +1 or 0)
``` where:
  SP_HMV=Same parity horizontal motion vector.
  SP_VMV=Same parity vertical motion vector.
  HDMV=Horizontal differential motion vector.
    (values=-1, 0, +1)
  VDMV=vertical differential motion vector.
    (values=-1, 0, +1)
  BM_HDMV=Best match horizontal differential motion vector.
    (values=-2, -1, 0, +1, +2)
  BM_VDMV=Best match vertical differential motion vector.
    (values=-2, -1, 0, +1, +2)

All vectors are specified in ½ pel notation.

Figure 7:
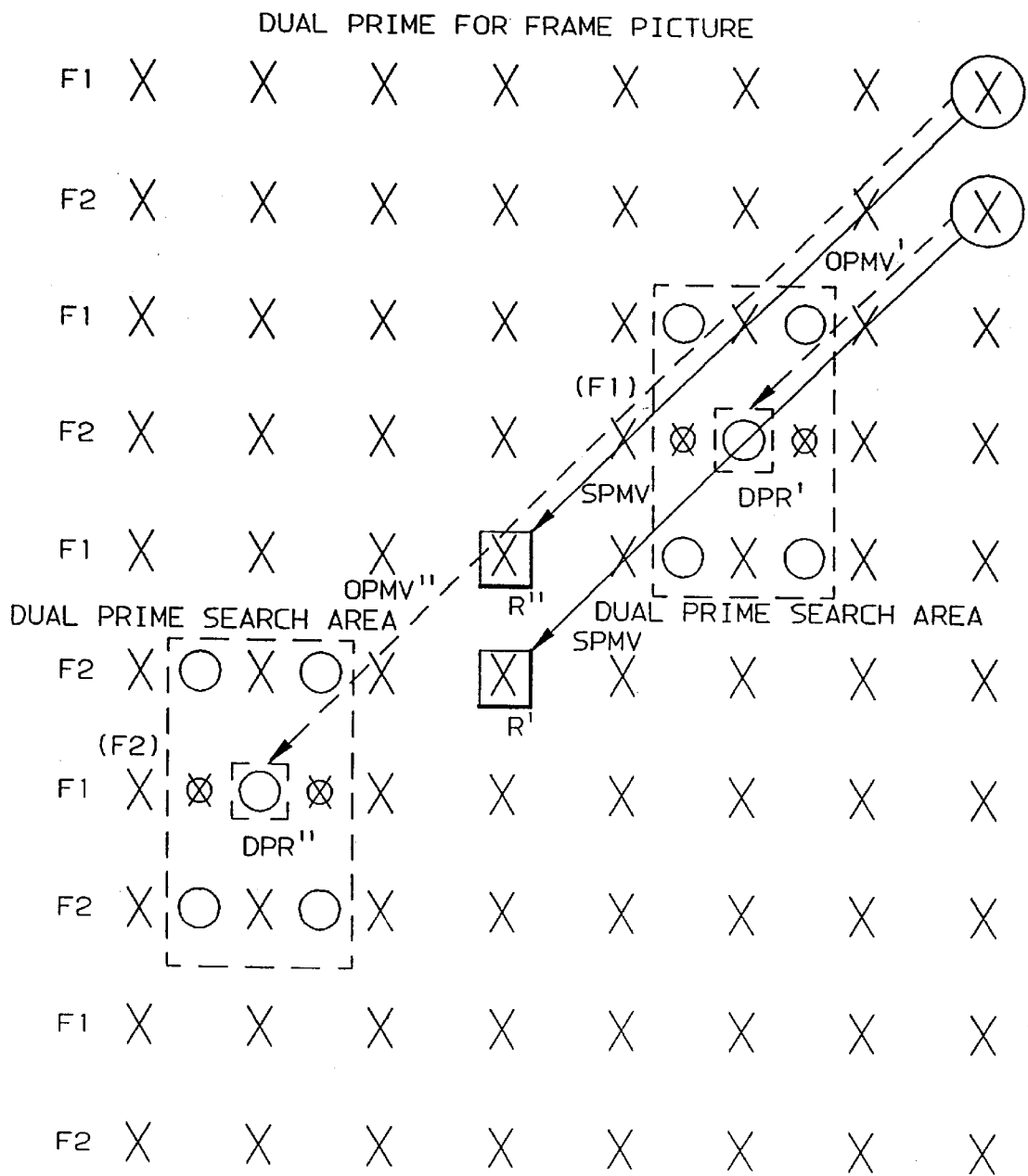
FIG. 7 is a representation of the Dual Prime vectors for a frame picture. The FIGURE shows the opmv', opmv", spmv', and spmv" vectors, the references DPR', DPR", R', and R", and the Dual Prime Search Areas.

For a frame-structured picture, the relative parity of the best match reference MB must match that of the current MB in accordance with the MPEG standard. In this case, two independent motion vector scaling operations are performed, one for each parity field which comprises the reference MB. As shown in FIG. 7, the reference data motion vector spmv, which points at starting location R' of the best match reference MB, is scaled by a factor of 0.5, represented by motion vector opmv'. This scaled motion vector, which represents the Dual Prime motion vector for the first field of the current MB, points at the starting location R" of the Dual Prime reference data. Also, the reference data motion vector spmv, which points at starting location R" of the best match reference MB, is scaled by a factor of 1.5, represented by motion vector opmv". This scaled motion vector, which represents the Dual Prime motion vector for the second field of the current MB, points at the starting location DPR" of the Dual Prime reference data. These locations, which are of opposite parity with respect to both the current and reference MBs, represent the center of a one square pel window which may be searched for the Dual Prime motion estimation best match.

Upon deriving the Dual Prime reference motion vector(s), microcode outputs the following data so that hardware can perform the Dual Prime search operation:

Dual Prime Address indicates the starting memory address from which to fetch full pel DPR data.

Dual Prime Full Pel X-Y Pointer indicates if the Dual Prime motion vector which pertains to the DPR data being fetched points at a full or half pel in both the x (horizontal) and y (vertical) dimensions. Two bits are defined so that four conditions may be represented (XFULL-YFULL, XFULL-YHALF, XHALF-YFULL, XHALF-YHALF).

Dual Prime Edge Detection indicates if the Dual Prime motion vector which pertains to the DPR data being fetched points at a location which lies on one or more picture boundaries. Four bits are defined (Top, Bottom, Left, Right) so that nine conditions may be represented (no boundary interception (NONE), Top (T), Bottom (B), Left (L), Right (R), Top-Left (TL), Bottom-Left (BL), Top-Right (TR), Bottom-Right (BR)).

Note that the system provides for holding two sets of the above referenced data which is output by microcode so that two independent Dual Prime field searches may occur when encoding a frame-structured picture.

Once the system completes the Dual Prime search initiated by microcode, two results are returned for microcode usage. These are the Best Match Dual Prime Accumulated Difference and Offset Location, which are described in more detail below. The Best Match Dual Prime Accumulated Difference value is compared against the best non-Dual Prime result for a given MB, and microcode selects the overall best match result for output by the hardware. The microcode prompts the system to output both the current and best match reference MBs by writing to the Best Match Result facility.

Hardware Functions

The first step the system performs once the microcode initiates a Dual Prime operation is to determine the amount of DPR data to be fetched to perform the search and the actual number of Dual Prime searches which will be performed. Hardware derives both these quantities based on the values which are set by microcode into the Dual Prime Full Pel X-Y Pointer and the Dual Prime Edge Detection facilities, as well as the picture structure (that is, field or frame). Table 2 of FIG. 10 provides the translation mechanism used to determine both the DPR data fetch size and the number of valid Dual Prime searches. This table is derived from a consideration of how a video picture is structured, especially at its boundaries. An example of such a picture is provided in FIG. 8.

Figure 8:
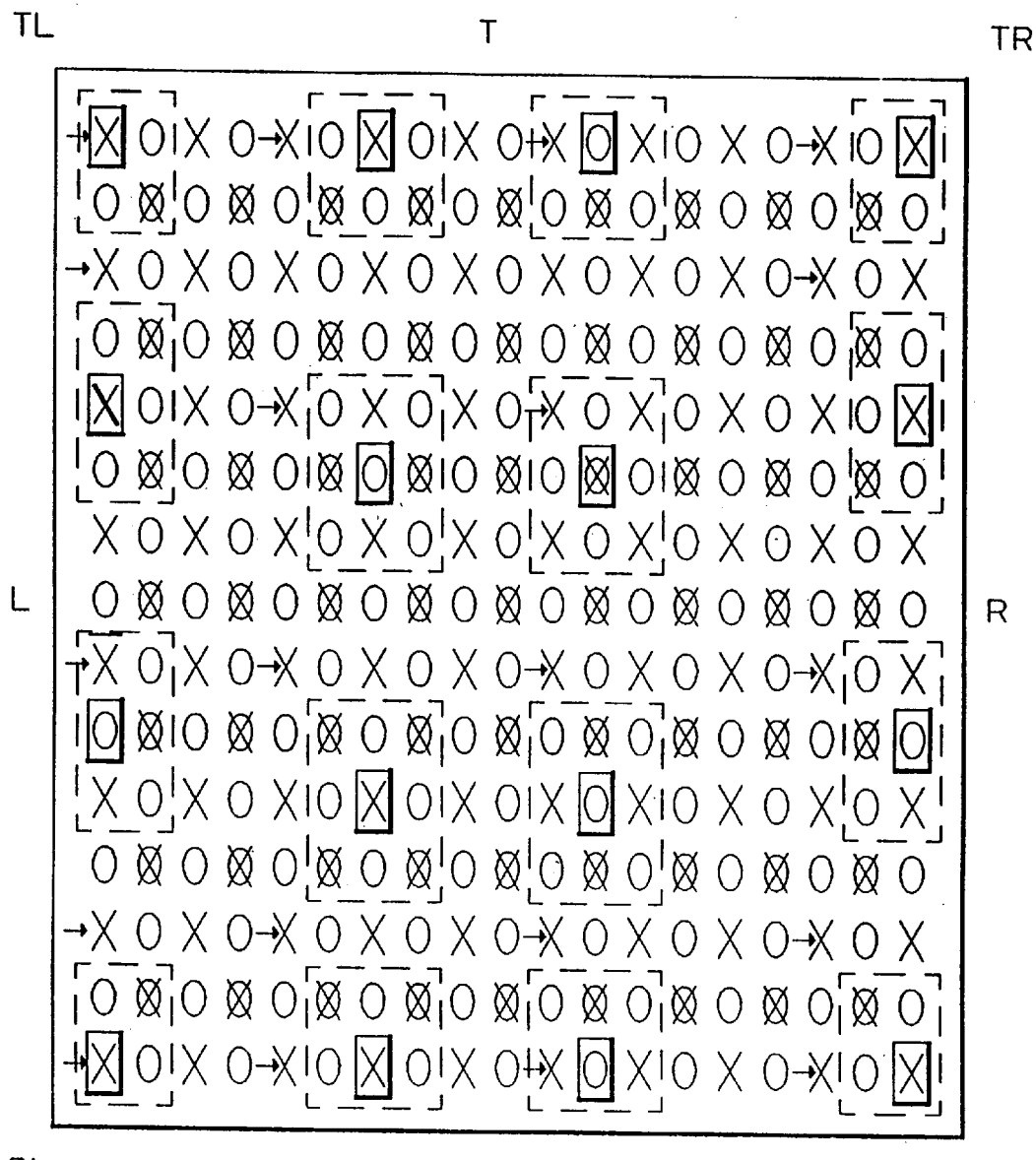
FIG. 8 illustrates a pattern of video picture dual prime search areas, where the solid block indicates the pel location pointed to by a Dual Prime motion vector, the arrows indicate the starting pel locations at which to begin the DPR data fetch, and the broken line boxes indicate the starting pel locations of searched DPR macroblocks.

In FIG. 8, a picture is shown to be constructed of three pel types. The first type, denoted by X, is referred to as a full pel location. In a real video picture, these are the actual display locations which are illuminated. The remaining pel types are derived by interpolating, or averaging, adjacent full pel locations. The second pel type, denoted by O, is referred to as a half pel location. This pel type may be further subdivided into either a vertical half pel, which is derived by averaging two adjacent full pets in the vertical picture plane, or a horizontal half pel, which is derived by averaging two adjacent full pels in the horizontal picture plane. The third pel type, denoted by O-X, is referred to as a quarter pel location, which is derived by averaging four adjacent full pels. Each of these pel types may be used to perform a Dual Prime search operation. In addition, picture edge locations are denoted in the figure by the set T (Top), B (Bottom), L (Left), and R (Right).

As shown in FIG. 8, the number of Dual Prime searches which are possible may be completely determined based on the number of picture boundaries which are intercepted by the Dual Prime motion vector as indicated by the Dual Prime Edge Detection facility. In particular, the maximum set of nine Dual Prime search locations are checked when no picture edge locations are intercepted, while either six or four Dual Prime search locations are checked when either one or two picture edge locations, respectively, are intercepted.

The fetch size is determined based on three factors:
Picture Structure (Field or Frame)

As shown in Table 2 of FIG. 10, nearly twice as much DPR data per fetch is required when processing field-structured pictures relative to frame-structured pictures. This results because a field-structured picture MB consists of only a single field ($F_1$ or $F_2$), while a frame-structured picture consists of two fields ($F_1$ and $F_2$). Since Dual Prime motion estimation is field-based, only half as much data must be fetched in the vertical dimension for a given fetch when processing a frame-structured picture. However, twice as many fetches are required relative to field-structured pictures because two fields comprise each MB. Therefore, the total amount of DPR data to be fetched for the Dual Prime search of an entire field or frame MB is approximately the same.

Dual Prime Edge Detection Value

As previously mentioned, the maximum number of feasible Dual Prime search locations decreases with the number of edges which are intercepted by the Dual Prime motion vector. As the number of searches decreases, so does the amount of DPR data to be fetched for the overall search operation. Thus, the amount of DPR data to be fetched decreases as the number of intercepted edges increases.

Dual Prime Full Pel X-Y Pointer Value

As previously mentioned, the value of this facility determines the type of pel referenced by the Dual Prime motion vector. A value of XFULL-YFULL implies that a full pel location is referenced, a value of XFULL-YHALF or XHALF-YFULL implies that a vertical or horizontal half pel location, respectively, is referenced, and a value of XHALF-YHALF implies that a quarter pel location is referenced. This pel represents the center point of the Dual Prime search window, where valid search locations may be found by moving a maximum of plus or minus one-half pel in both the vertical and horizontal picture planes. Since all the fetched DPR data must lie with in the picture boundaries, certain Dual Prime search locations are excluded when the Dual Prime motion vector intercepts one or more picture boundaries.

As shown in FIG. 8, sixteen unique Dual Prime search windows are defined based on the values contained in the Dual Prime Edge Detection and Full Pel X-Y Pointer facilities. The pet sets enclosed by dotted lines define the starting locations of DPR MBs which participate in the Dual Prime search operation. For field-structured pictures, each DPR MB consists of 256 pels, organized as a 16×16 block. For frame-structured pictures, two independent DPR MB searches are performed, each comprising 128 pels in a 16×8 block organization. Furthermore, if interpolated pel search locations appear in the top or bottom row of a given pel set, then additional horizontal and/or vertical DPR data must be fetched in order to derive the required DPR MB data which will be searched. In general, the following equations may be used.

$$Y\_FETCH = 18 - [YHALF + T + B + (8)(FRM\_PIC)]$$

$$X\_FETCH = 18 - [XHALF + L + R]$$

In these equations, X_FETCH represents the number of pels per row which will be fetched, Y_FETCH represents the number of rows which will be fetched, XHALF represents whether a half or full pel location is pointed to by the Dual Prime motion vector in the horizontal dimension (0 for full pel, 1 for half pel), YHALF represents whether a half or full pel location is pointed to by the Dual Prime motion vector in the vertical dimension (0 for full pel, 1 for half pel), T represents whether the Dual Prime motion vector impinges the top picture edge (0 for no interception, 1 for top edge interception), B represents whether the Dual Prime motion vector impinges the bottom picture edge (0 for no interception, 1 for bottom edge interception), L represents whether the Dual Prime motion vector impinges the left picture edge (0 for no interception, 1 for left edge interception), R represents whether the Dual Prime motion vector impinges the right picture edge (0 for no interception, 1 for right edge interception), and FRM_PIC indicates the picture structure (0 for field, 1 for frame).

Once the fetch size has been derived, the current MB, reference MB and DPR data are fetched from memory and the Dual Prime search operation is begun. The following hardware algorithm is implemented to perform all Dual Prime search operations for a given Dual Prime search window:

```
/* Part 1 - Initialize Variables */
y_max=16;
loop_cnt=1;
do z=1 to 9
    dp_accum(z)=0;
end;
if frm_pic
then
do
    y_max=8;
    loop_cnt=2;
end;
do loop=1 to loop_cnt
/* Part 2 - Fetch Required Current, Reference and DPR MB Data */
if ^frm_pic
then
do
    fetch_mb(cmb);
    fetch_mb(rmb);
    fetch_mb(dpr);
end;
if frm_pic & (loop=1)
then
do
    fetch_f1(cmb);
    fetch_f1(rmb);
    fetch_f2(dpr);
end;
if frm_pic & (loop=2)
```

-continued

```
then do
    fetch_f2(cmb);
    fetch_f2(rmb);
    fetch_f1(dpr);
end;
/* Part 3 - Perform Dual Prime Search Operations */
do r=1 to max_search_num
    z=find_search_unit(r);
    do (y=1 to y_max) & (y'=dpr_y_offset(r) to dpr_y_offset(r)+y_max-1)
        do (x=1 to 16) & (x'=dpr_x_offset(r) to dpr_x_offset(r)+15)
            if dpr_fp_search(r)
            then dpr_ave=dpr(x',y');
            if dpr_hhp_search(r)
            then dpr_ave=dpr(x',y')+dpr(x'+1,y')]//2;
            if dpr_vhp_search(r)
            then dpr_ave=dpr(x',y')+dpr(x',y'+1)]//2;
            if dpr_qp_search(r)
            then dpr_ave=[dpr(x',y')+dpr(x'+1,y') + dpr(x',y'+1) + dpr(x'+1,y'+1)]//4;
            dp_accum(z)=dp_accum(z)+|cmb(x,y)-([rmb(x,y) + dpr_ave]//2);
        end;
    end;
end;
```

The above algorithm is divided into three parts:

(1) Variable Initialization

This part initializes variables which are required in the other parts of the algorithm. The variables y_max (the maximum number of rows to be searched) and loop_cnt (the number of passes through the algorithm) are initialized differently depending on whether the picture structure is field or frame. For a frame picture, y_max is divided by two and loop_cnt is multiplied by two when compared with a field picture as discussed earlier. Additionally, the vector dp_accum(1:9), which is used to hold the results for up to nine Dual Prime search operations, is initialized to zero.

(2) Data Fetch

This part fetches the required current MB (cmb), reference MB (rmb) and Dual Prime reference (dpr) data from memory. Three services are provided to perform the required fetches. First, fetch_mb is used to fetch required data in MB format. This implies a data fetch in which rows are fetched in a progressive fashion (ie. no row skipping). This service is utilized when the picture structure is field. The second service, fetch_$F_1$, is used to fetch only odd rows of data (that is, even rows skipped). The last service, fetch_$F_2$, is used to fetch only even rows of data (ie. odd rows skipped). The latter two services are utilized when the picture structure is frame. As specified in the MPEG standard, the same parity fields are fetched for the current and reference MBs, and the opposite parity field is fetched for the DPR data in order to perform Dual Prime search operations on a specific field of a frame picture.

(3) Dual Prime Search Operations

The final part of the algorithm performs the actual Dual Prime search operations. The variable max_search_num identifies the number of searches which will be performed for the current search window as defined in Table 2. The service find_search_unit is used to identify the appropriate accumlator to be used for the current Dual Prime MB search operation. This service assures that corresponding window offsets for the two independent field searches which are performed in a frame-structured picture are steered to the same accumulator. In order to accomplish this goal, find_search_unit is structured so that the set of DPR pel locations to which the Dual Prime motion vector points for a given search window are assigned to be searched by accumulator 5. The set of DPR pel locations to the top-left, top, top-right, left, right, bottom-left, bottom and bottom-right with respect to this location are assigned to be searched by accumulator 1, 2, 3, 4, 6, 7, 8 and 9, respectively. Thus, each invocation of find_search_unit will return the appropriate accumulator number based on the set of pel locations currently being searched.

The variables y and y' are used to identify the particular row, while x and x' are used to identify a particular pel position with in the row being searched with in the current/reference MBs and the DPR MB data, respectively. Two additional services are defined as part of the y' and x' variables. These are dpr_y_offset and dpr_x_offset. These routines are used to return the DPR data offset values in both the y and x picture planes that will access DPR data required to perform the current Dual Prime MB search operation.

The first step in performing the actual Dual Prime search computation is to determine the proper DPR data value required. The variable used for this purpose is dpr_ave. The value assigned to this variable may be interpolated (averaged) or uninterpolated (full pel value) based on whether the current DPR MB required consists of half/quarter or full pels, respectively. Four additional services are defined to determine the DPR pel type being used in the current Dual Prime search operation. The dpr_fp_search, dpr_hhp_search, dp_vhp_search and dp_qp_search routines determine if the DPR pel type for the current Dual Prime search operation is full, horizontal half, vertical half and quarter, respectively. Note that all DPR interpolation operations specify integer division with rounding away from zero, in conformance with the MPEG standard.

The final step in performing the Dual Prime search computation is to update a particular accumlator with the current pel location search result. The value which is added represents the absolute value of the difference between the current MB pel location cmb(x,y) and the interpolation of the reference MB pel location rmb(x,y) with the interpolated DPR data dpr_ave. This same process is repeated for each pel location which comprises the DPR MB being searched.

Once all Dual Prime search operations corresponding to a particular DPR search window have been performed, two results are returned to the microcode:

Best Match Dual Prime Accumulated Difference. This result corresponds to the minimum value from the set of accumulators used to perform the Dual Prime search operation.

Best Match Dual Prime Offset Location. This result represents the motion vector offset, referred to as the differential motion vector (dmv), which corresponds to the minimum accumulated difference. Both the x and y components of the dmv vary in magnitude from −½ to +½ pel, and both are calculated with respect to an origin which corresponds to the pel location referenced by the original Dual Prime motion vector (that is, the center of the Dual Prime search window).

In the case where multiple Dual Prime search locations produce the same minimum result, an algorithm must be devised to select a single offset location. The algorithm which was devised optimizes motion vector encoding efficiency. According to the MPEG standard, the dmv which pertains to the DPR data is variable-length encoded per Table 3. In this encoding scheme, a dmv component value of 0 pels requires one encoded bit, while values of −½ and +½ pel require two encoded bits. In order to optimize encoding efficiency for the maximum Dual Prime search window size, the nine search locations are first prioritized in three groups according to the total number of bits required to encode both the x and y dmv components. FIG. 9 shows the nine possible search locations, lettered a to i, with location e corresponding to the center of the Dual Prime search window. The highest priority group consists of location e, since it requires the fewest number of bits (2) to encode. The next highest priority group consists of locations b, d, f and h, since they require the next fewest number of bits (3) to encode. The lowest priority group consists of locations a, c, g and i, since they require the largest number of bits (4) to encode. Note that with in the lower priority groups the order in which dmvs are selected does not matter based on motion vector encoding efficiency. The order in which these locations are listed in FIG. 9 corresponds to the priority with in each group.

While the invention has been described with respect to certain preferred embodiments and exemplifications, it is not intended to limit the scope of the invention thereby, but solely by the claims appended hereto.

We claim:

1. A method of generating motion vectors from a macroblock in a current field to a macroblock in a past field for inter-picture video compression in a motion picture having images of $F_1$ and $F_2$ parities, comprising the steps of:

a. defining a macroblock in a parity field of the current picture;

b. searching the preceding field of the same or opposite parity to find a first best match macroblock in said preceding field;

c. forming a vector from the current macroblock in the current parity field to the first best match macroblock in said preceding field of the same or opposite parity;

d. scaling the vector so formed in step c. so that the scaled vector refers to a dual prime macroblock in the opposite parity field with respect to the first best match macroblock which defines the center of a dual prime search window;

e. taking the average of the first best match macroblock and a set of dual prime macroblock locations in the dual prime search window and searching to determine a best match dual prime macroblock; and f. forming a dual prime motion vector and differential motion vector (dmv) which point to both the first best match macroblock and the best match dual prime macroblock.

2. The method of claim 1 wherein the first best match macroblock is displaced d pixels from the current macroblock, wherein d is an integer.

3. The method of claim 1 wherein a second best match macroblock is displaced d/2, 3d/2, or 2d pixels from the current macroblock wherein d is an integer.

4. The method of claim 1 comprising conducting a search at half pixel locations inside a four square pixel dual prime search window.

5. The method of claim 1 comprising conducting a search for the best match dual prime macroblock within a one square pixel search area.

6. The method of claim 5 comprising conducting a nine point search.

* * * * *